United States Patent
Klinglmair et al.

(10) Patent No.: US 9,004,770 B2
(45) Date of Patent: Apr. 14, 2015

(54) SENSOR BEARING ASSEMBLY FOR A PULLEY

(71) Applicants: Erich Klinglmair, Steyr (AT); Thomas Forster, Waidhofen (AT); Janice Duffy, Plymouth, MI (US)

(72) Inventors: Erich Klinglmair, Steyr (AT); Thomas Forster, Waidhofen (AT); Janice Duffy, Plymouth, MI (US)

(73) Assignee: Aktiebolaget SKF, Gothenburg (SE)

( * ) Notice: Subject to any disclaimer, the term of this patent is extended or adjusted under 35 U.S.C. 154(b) by 78 days.

(21) Appl. No.: 13/713,507

(22) Filed: Dec. 13, 2012

(65) Prior Publication Data

US 2014/0171245 A1    Jun. 19, 2014

(51) Int. Cl.
    F16C 41/00    (2006.01)
    F16C 19/22    (2006.01)
    F16C 19/28    (2006.01)
    F16H 55/36    (2006.01)

(52) U.S. Cl.
    CPC ............ *F16C 41/007* (2013.01); *F16C 19/225* (2013.01); *F16C 19/28* (2013.01); *F16H 55/36* (2013.01); *F16C 2240/26* (2013.01)

(58) Field of Classification Search
    CPC .................................. F16C 41/07; F16C 19/52
    USPC ............................... 384/448; 324/174, 207.25
    See application file for complete search history.

(56) References Cited

U.S. PATENT DOCUMENTS

| | | | | |
|---|---|---|---|---|
| 4,988,219 | A  * | 1/1991 | Peilloud | 384/448 |
| 5,129,742 | A  * | 7/1992 | Tilch et al. | 384/448 |
| 5,381,090 | A  * | 1/1995 | Adler et al. | 324/174 |
| 6,535,135 | B1 * | 3/2003 | French et al. | 340/682 |
| 6,538,427 | B1 * | 3/2003 | Silvasi et al. | 324/174 |
| 6,679,633 | B2 * | 1/2004 | Chambert | 384/448 |
| 7,583,079 | B2 * | 9/2009 | Koike et al. | 324/207.25 |
| 8,636,417 | B2 * | 1/2014 | Kakuda et al. | 384/448 |
| 2006/0110086 | A1 * | 5/2006 | Morita et al. | 384/448 |
| 2011/0253469 | A1 * | 10/2011 | Landrieve | 180/219 |

FOREIGN PATENT DOCUMENTS

WO    WO 2004025307 A1 *    3/2004

\* cited by examiner

*Primary Examiner* — Thomas R. Hannon
(74) *Attorney, Agent, or Firm* — Mark A. Ussai; SKF USA Patent Dept.

(57) ABSTRACT

A sensor bearing assembly rotatably couples a pulley sheave with a shaft and includes an inner member with a central bore receiving a portion of the shaft, two axially spaced inner raceway surfaces and a central portion between the raceways. An outer member is disposed about the inner member and disposeable within the sheave bore to rotatably couple the sheave with the shaft. The outer member has two axially spaced outer raceway surfaces disposed about the two inner raceway surfaces and a central portion between the outer raceways and disposed about inner member central portion to define an annular cavity. An annular detection member is disposed within the annular cavity and coupled with the outer member and a sensor is disposed within the annular detection member and connected with the inner member central portion. The sensor is configured to sense angular displacement of the detection member about the bearing axis.

19 Claims, 6 Drawing Sheets

SENSOR BEARING ASSEMBLY FOR A PULLEY

BACKGROUND OF THE INVENTION

The present invention relates to bearings, and more particularly to sensor bearing assemblies.

Sensor bearing assemblies are known and typically include a bearing with inner and outer annular members or "rings", one or more rows of rolling elements disposed between the two rings, and at least one sensor for sensing rotation of either the inner or outer ring, and thereby the rotation of an inner or outer component supported by the bearing. Typically, the sensor(s) are mounted within a fixed outer ring and sense rotation of the inner ring, and thereby the shaft to which it is mounted. With a pulley assembly, angular displacement and/or rotational velocity of the pulley sheave is generally sensed indirectly, for example, by sensing angular displacement of a motor driving the pulley through a chain and sprocket arrangement.

SUMMARY OF THE INVENTION

In one aspect, the present invention is a sensor bearing assembly for rotatably coupling a pulley sheave with a shaft, the sheave having a bore and the shaft having an axis. The sensor bearing assembly comprises a generally annular inner member with a central bore sized to receive a portion of the shaft so as to mount the bearing to the shaft. The inner member has first and second axially spaced inner raceway surfaces and a central portion extending generally axially between the two inner raceway surfaces. A generally annular outer member is disposed about the inner member and is disposeable within the sheave bore, the outer member being coupleable with the sheave to rotatably couple the sheave with the shaft. The outer member has first and second, axially spaced outer raceway surfaces each disposed about a separate one of the first and second inner raceway surfaces and a central portion extending generally axially between the two outer raceway surfaces. The outer member central portion is disposed generally about the inner member central portion so as to define an annular cavity. A first set of rolling elements is disposed between the first inner and outer raceway surfaces and a second set of rolling elements is disposed between the second inner and outer raceway surfaces. Further, a generally annular detection member is disposed within the annular cavity and is coupled with the outer member, and a sensor is disposed within the annular detection member. The sensor is connected with the inner member central portion and is configured to sense angular displacement of the detection member about the bearing axis, and thereby angular displacement of the pulley sheave about the shaft axis.

In another aspect, the present invention is again a sensor bearing assembly for rotatably coupling a pulley sheave with a shaft, the sheave having a bore and the shaft having an axis. The bearing assembly comprises all the elements described in the previous paragraph, and includes the following additional features. The bearing inner member has opposing axial ends and further includes a cable passage extending generally axially between the central portion and at least one of the two axial ends. The sensor includes a body and at least one cable extending through the inner member cable passage, the cable having a first end attached to the sensor body and a second end disposed externally of the sensor bearing assembly.

In yet another aspect, the present invention is a pulley assembly comprising a pulley sheave having a bore, a shaft having an axis, and a sensor bearing assembly configured to rotatably couple the sheave with the shaft. The sensor bearing assembly has an axis collinear with the shaft axis and comprises a generally annular inner member with a central bore sized to receive a portion of the shaft so as to mount the bearing to the shaft. The inner member has first and second axially spaced inner raceway surfaces and a central portion extending generally axially between the two inner raceway surfaces. A generally annular outer member is disposed about the inner member and is disposeable within the sheave bore, the outer member being coupleable with the sheave to rotatably couple the sheave with the shaft. The outer member has first and second, axially spaced outer raceway surfaces each disposed about a separate one of the first and second inner raceway surfaces and a central portion extending generally axially between the two outer raceway surfaces. The outer member central portion is disposed generally about the inner member central portion so as to define an annular cavity. A first set of rolling elements is disposed between the first inner and outer raceway surfaces and a second set of rolling elements is disposed between the second inner and outer raceway surfaces. Further, a generally annular detection member is disposed within the annular cavity and is coupled with the outer member, and a sensor is disposed within the annular detection member. The sensor is connected with the inner member central portion and is configured to sense angular displacement of the detection member about the bearing axis, and thereby the angular displacement of the sheave about the shaft axis.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
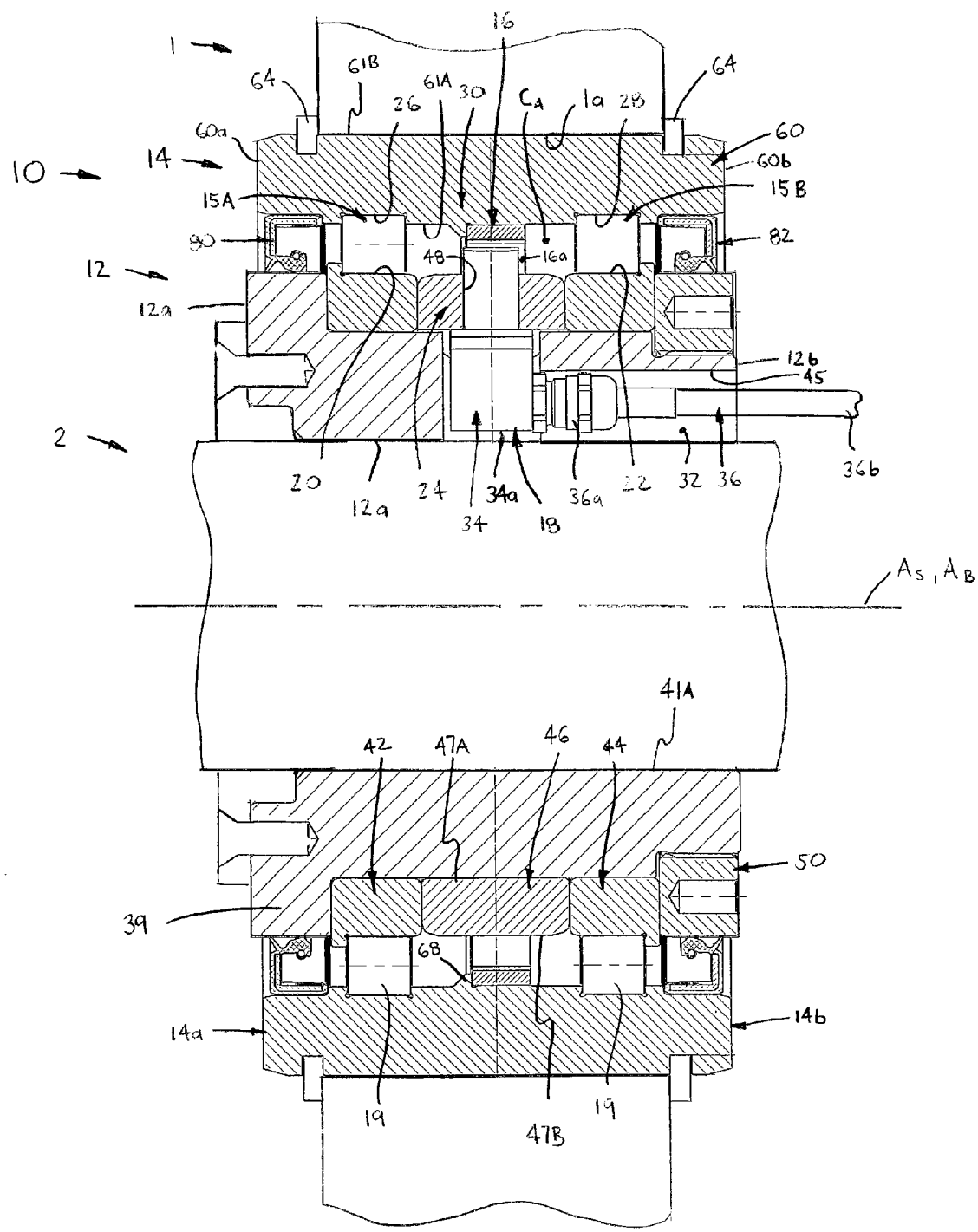
FIG. 1 is an axial cross-sectional view of a sensor bearing assembly in accordance with the present invention, shown mounted on a shaft and within a pulley sheave.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-6 a sensor bearing assembly 10 for rotatably coupling a pulley sheave 1 with a shaft 2, the sheave 1 having a bore 1a and the shaft 2 having an axis $A_S$. The sensor bearing assembly 10 has a central axis $A_B$ and basically comprises a bearing inner member 12, a bearing outer member 14, first and second sets of rolling elements 15A, 15B, a detection member 16 and a sensor 18. The bearing inner member 12 is generally annular and has a central bore 12a sized to receive a portion of the shaft 2 so as to mount the bearing assembly 10 upon the shaft 2, the bearing axis $A_B$ then being collinear with the shaft axis $A_S$. The inner member 12 has opposing axial ends 12a, 12b, first and second, axially-spaced inner raceway surfaces 20, 22 and a central portion 24 extending generally axially between the two inner raceway surfaces 20, 22. The outer member 14 is generally annular, is disposed about the inner member 12 and is disposeable within the sheave bore 1a, the outer member 14 being coupleable with the sheave 1 to rotatably couple the sheave 1 with the shaft 2. The outer member 14 has opposing axial ends 14a, 14b, first and second, axially-spaced outer raceway surfaces 26, 28 each disposed about a separate one of the first and second inner raceway surfaces 20, 22, respectively, and a central portion 30 extending generally axially between the two outer raceway surfaces 26, 28. The central portion 30 of the outer member 14 is disposed generally about, and spaced radially outwardly from, the inner member central portion 24 so as to define an interior annular cavity $C_A$.

Additionally, the first set of rolling elements 15A is disposed between the first inner and outer raceway surfaces 20, 26 and the second set of rolling elements 15B is disposed between the second inner and outer raceway surfaces 22, 28. Preferably, the rolling elements 15A, 15B are cylindrical rollers 19 as depicted in the drawing figures, but may alternatively be any other type of rolling element, such as spherical balls, tapered rollers, toroidal rollers, etc, and may provided in any appropriate quantity. Further, the detection member 16 is generally annular, has a central bore 16a and is disposed within the bearing annular cavity $C_A$. The detection member 16 is coupled with the bearing outer member 14 so as to angularly displace or rotate therewith. Preferably, the detection member 16 is a separate ring 70 connected with the outer member central portion 30, but may alternatively be integrally formed with the central portion 30, as discussed in further detail below.

Furthermore, the sensor 18 is disposed generally within the bore 16a of the annular detection member 16 and is connected with the inner member central portion 24, preferably by being attached to a mounting ring 46 partially forming the central portion 24, as described below. The sensor 18 is configured to sense angular displacement of the detection member 16 about the bearing axis $A_B$ so as to detect angular displacement of the sheave 1 about the axis $A_S$. Depending on the subsequent processing of output signals from the sensor 18 (as discussed below), the detected sheave angular displacement may be used to determine angular position, total angular displacement, and/or angular velocity of the sheave 1. Although only one sensor 18 is depicted in the drawing figures, the sensor bearing assembly 10 may have two or more sensors 18, particularly if redundancy is desired for reliability purposes.

Figure 2:
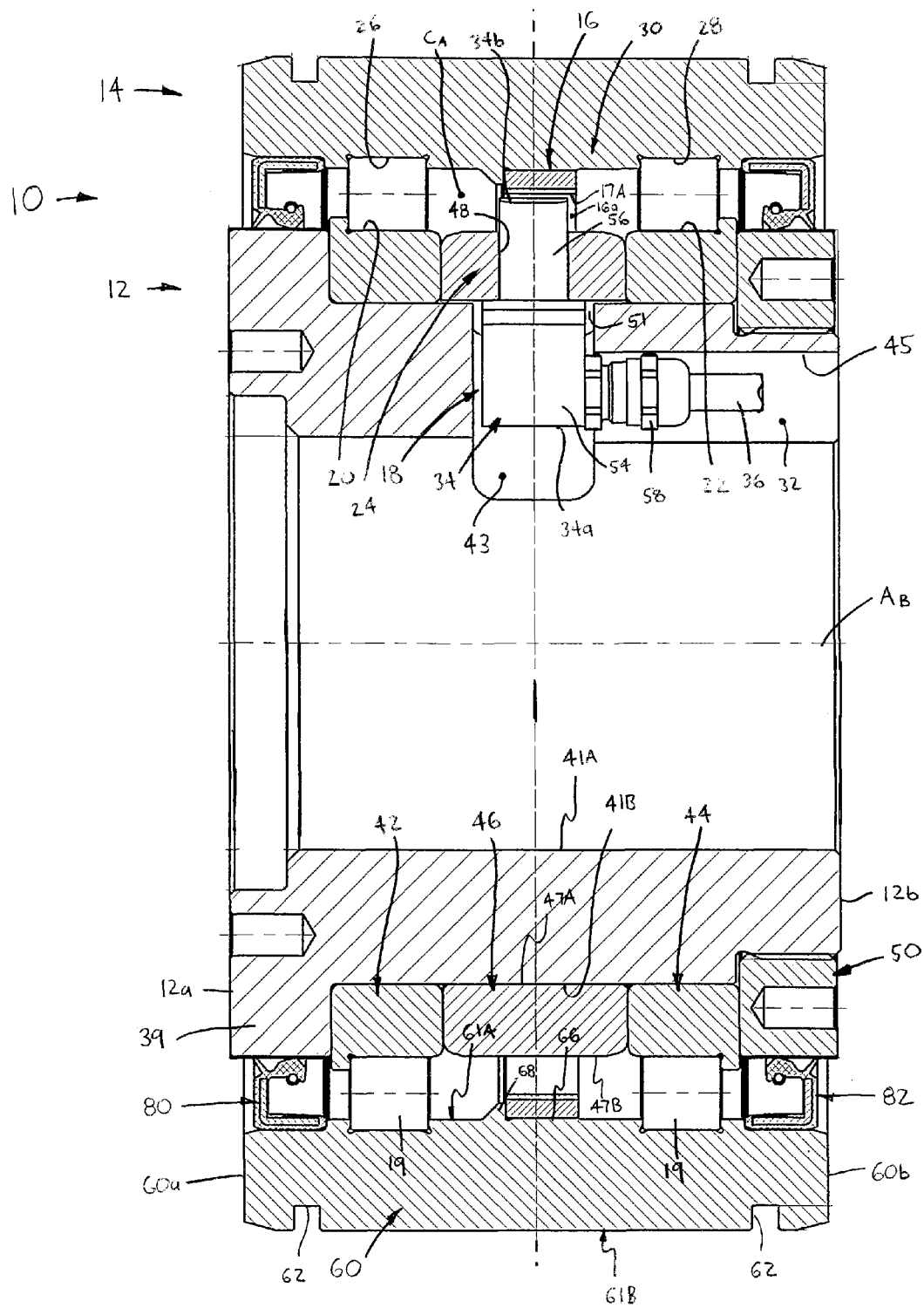
FIG. 2 is an enlarged view of the sensor bearing assembly shown separate from the pulley and shaft.
Figure 3:
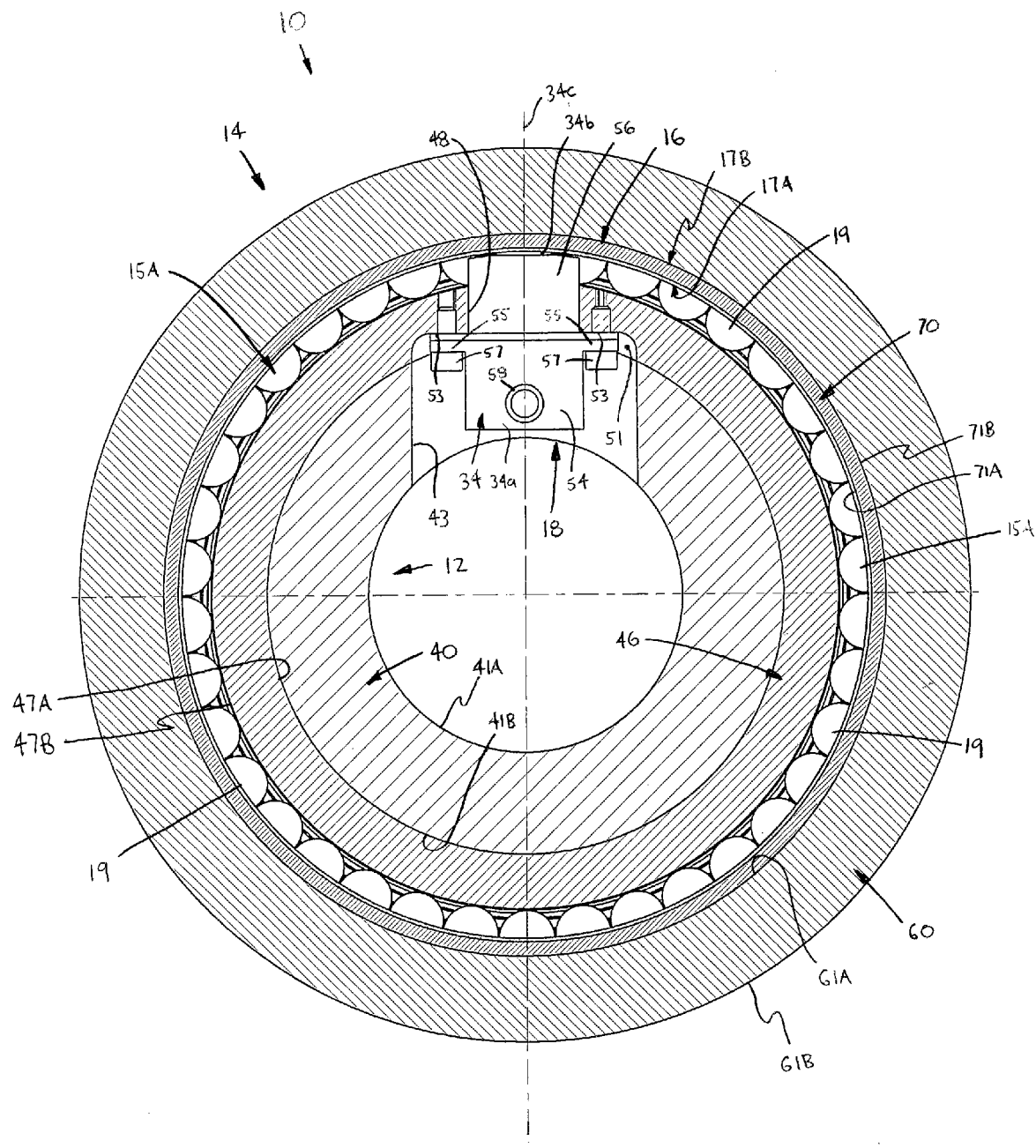
FIG. 3 is a radial cross-sectional view of the sensor bearing assembly.
Figure 4:
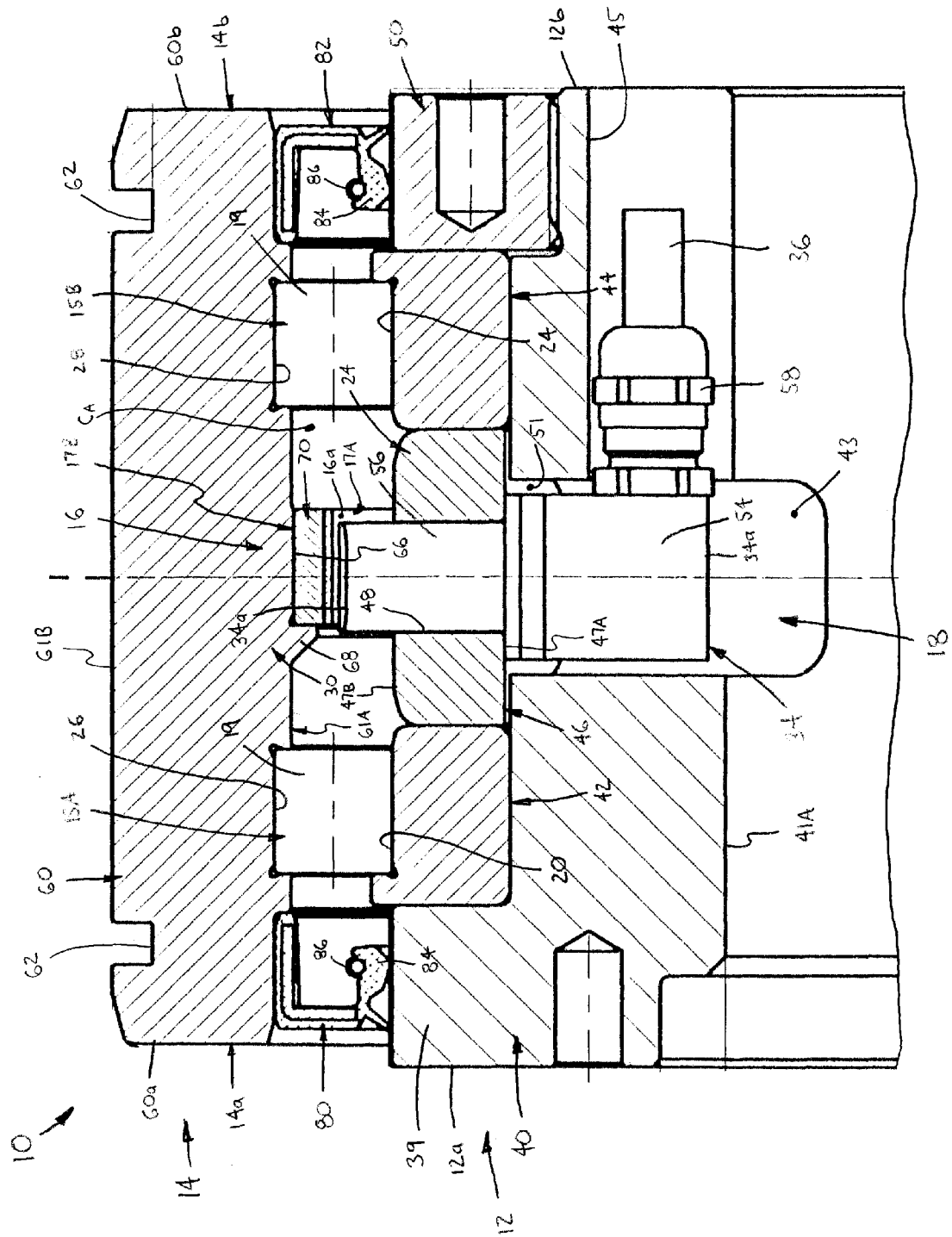
FIG. 4 is a broken-away, enlarged view of a portion of FIG. 2.
Figure 5:
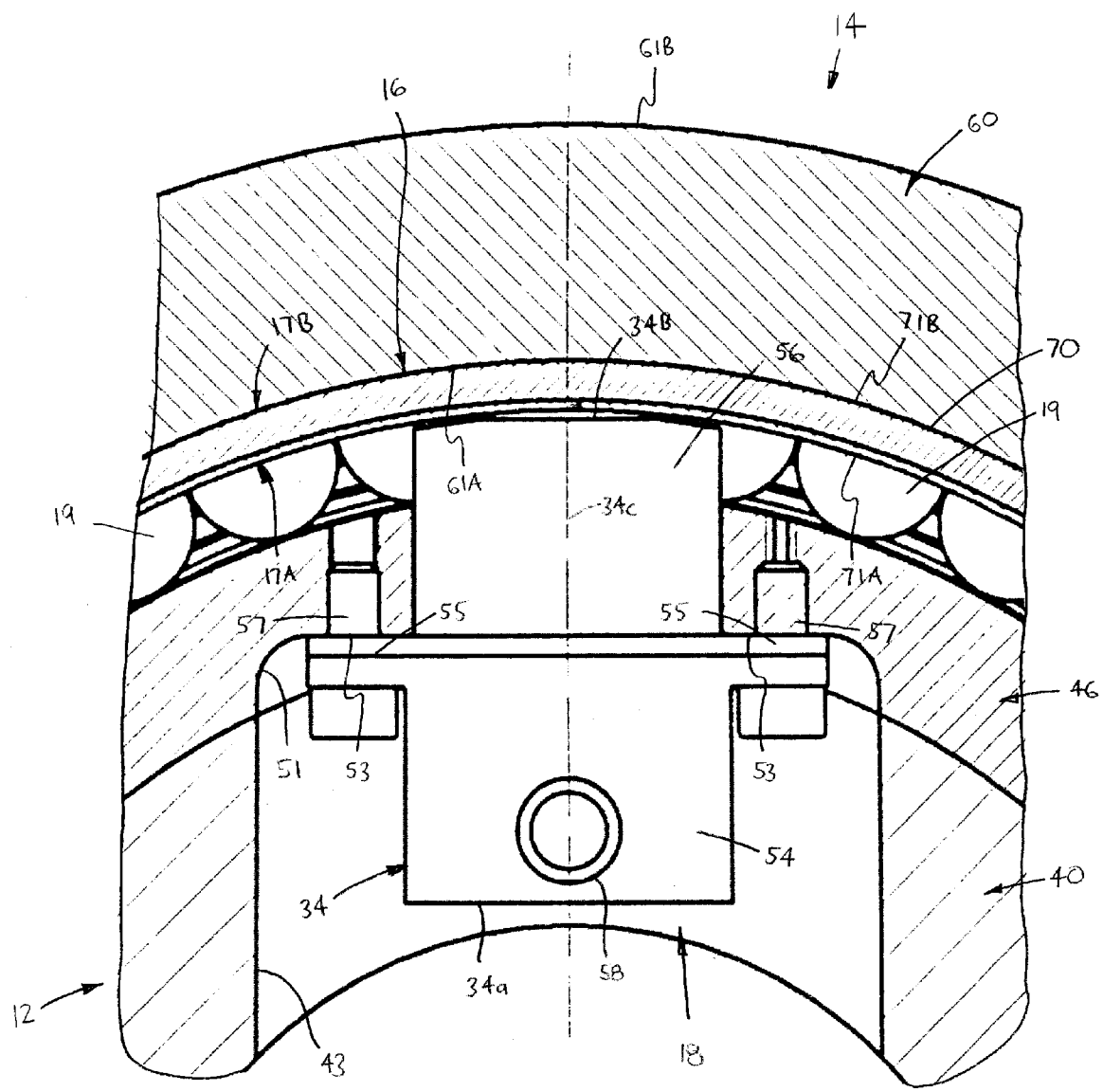
FIG. 5 is a broken-away, enlarged view of a portion of FIG. 3.

As best shown in FIGS. 1, 2 and 4, the bearing inner member 12 preferably has a cable passage 32 extending generally axially between the central portion 24 and at least one of the two axial ends 12a, 12b. Most preferably, the cable passage 32 is provided by an axial groove 45 extending radially inwardly from an inner circumferential 41A of the inner member 12, as described below. Further, the sensor 18 includes a body 34 and at least one cable 36 extending through the cable passage 32. The cable 36 has a first end 36a attached to the sensor body 34, and is thus located within the sensor bearing assembly 10, and a second end 36b disposed externally of the sensor bearing assembly 10 and coupled with a power supply (not shown) and/or a controller or other means for processing sensor signals (none shown). As the shaft 2 and bearing inner member 12 are fixed or non-rotatable with respect to the axis $A_S$, the cable 36 is also relatively fixed or immovable and not subject to damage or wear as would be the case with a cable connected to a sensor that rotates with the sheave 1.

Thus, the present sensor bearing assembly 10 provides a double-row bearing that is mountable between a pulley sheave 1 and shaft 2 (or between two members of any other device with an outer rotatable member) as a single unit and has a self-contained sensor 18 with fixed cabling impervious to damage or wear from rotation of the sheave 1. Having described the basic elements above, these and other components of the sensor bearing assembly 10 are described in greater detail below.

Referring now to FIGS. 1-4, the bearing inner member 12 is preferably a subassembly of five primary components: a main body ring 40, first and second raceway rings 42, 44, respectively, a sensor mounting ring 46 for connecting the sensor 18 with the inner member 12, and a retainer ring 50. The main body ring 40 is generally tubular and has inner and outer circumferential surfaces 41A, 41B, the inner surface 41A defining the inner member central bore 12a. The main ring 40 has a clearance hole 43 extending radially between the inner and outer circumferential surfaces 41A, 41B and an access groove 45. The access groove 45 provides the cable passage 32 and extends radially outwardly from the inner circumferential surface 41A and generally axially between the clearance hole 43 and one axial end 12b of the main ring 40. Further, the first and second raceway rings 42, 44 are each relatively axially narrow, are disposed circumferentially about the main ring outer surface 41B and are spaced axially apart. The first raceway ring 42 provides the first inner raceway surface 20 and the second raceway ring 44 provides the second inner raceway surface 22.

Furthermore, the sensor mounting ring 46 is preferably axially longer or "wider" than the raceway rings 42, 44, although the ring 46 may alternatively be similarly sized or axially "narrower" than the raceway rings 42, 44 in certain applications. The mounting ring 46 is disposed circumferentially about the main ring outer surface 41B and axially between the first and second raceway rings 42, 44. The mounting ring 46 has inner and outer circumferential surfaces 47A, 47B and a mounting hole 48 extending radially between the inner and outer surfaces 47A, 47B, the mounting hole 48 being generally radially aligned with the main ring clearance hole 43. Preferably, the mounting ring 46 further has a recessed pocket 51 formed in the inner surface 47A about the mounting hole 48 and providing flat mounting surfaces 53 adjacent to the hole 48 for attaching the sensor 18, as discussed below. Further, the retainer ring 50 is disposed on the main ring 40 adjacent to the one axial end 12b and is configured to axially retain the raceway rings 42, 44 and the mounting ring 46 on the main ring 40. Specifically, the three rings 42, 44 and 46 are "sandwiched" between the retainer ring 50 and a radially-outwardly extending annular shoulder 39 of the main ring 40 when the retainer ring 50 is mounted on the main ring 40.

As best shown in FIGS. 2-5, the sensor body 34 has a first, radially inner end 34a coupled with the bearing inner member 12, a second, radially outer end 34b spaced radially inwardly from, and located adjacent to, an inner circumferential surface 71A of the detection member 16, and a central axis 34c extending between the two ends 34a, 34b. The sensor body 34 is arranged on the mounting ring 46 such that the central axis 34c extends generally perpendicularly with respect to the central axis $A_B$ and to the inner surface 17A of the detection member 16. Preferably, the sensor body 34 includes an inner base portion 54, which is attached to the mounting ring 46 and includes the inner end 34a, and outer sensing portion 56 extending through the ring mounting hole 48 and providing the outer end 34b. The base portion 54 preferably includes a pair mounting ledges 55 each disposed on a separate mounting surface 53 of the ring 46 and connected to the ring 46 by threaded fasteners 57. The sensor base portion 54 also includes a cable interface 58 configured to receive the cable 36 for transmitting sensor output.

Preferably, the sensor 18 is a Hall Effect sensor, such that the sensing portion 56 includes at least one transducer, most preferably a printed circuit board ("PCB") containing at least one semi-conductor (neither depicted), that is configured to generate an output when the detection member 16 angularly displaces relative to the bearing central axis $A_B$, as discussed in greater detail below. Specifically, the sensor semi-conductor (not shown) is configured to generate an output voltage when exposed to a changing magnetic field, specifically a transition between a north pole 75 and a south pole 76 during rotation of the preferred detection member 16, as described below. However, the sensor 18 may be constructed in any other appropriate manner and/or be any other appropriate type of sensor for determining the angular position of the detection member 16. For example, the sensor 18 may include a photo detector (not shown) for receiving light from a light source passing through an optical pattern of transparent and opaque areas (not shown) of the detection member 16.

Referring again to FIGS. 1, 2 and 4, the bearing outer member 14 includes a generally tubular body 60 having inner and outer circumferential surfaces 61A, 61B and opposing axial ends 60a, 60b. The body outer circumferential surface 61B is engageable with the sheave bore 1a, preferably frictionally engageable, so as to mount the bearing assembly 10 within the sheave 1. Preferably, the outer member body 60 has two circumferential grooves 62 formed in the outer surface 61B and each located adjacent to a separate axial end 60a, 60b, each groove 62 receiving a retaining ring 64 (e.g., a Circlip) to retain the outer member 14 within the sheave bore 1a, as shown in FIG. 1. Further, the inner circumferential surface 61A includes the first and second outer raceway surfaces 26, 28 and a central surface section 66 located generally between the two outer raceway surfaces 26, 28. The central surface section 66 is sized to receive the detection member 16, as discussed below, and the outer member 14 preferably further has an annular locating shoulder 68 extending inwardly from the central surface section 66. The locating shoulder 68 provides a stop for preventing further axial movement of the detection member 16, thereby correctly positioning the detection member 16 relative to the sensor 18, when the detection member 16 is assembled within the bearing outer member 14 by sliding the member 16 within the inner surface 61A.

Figure 6:
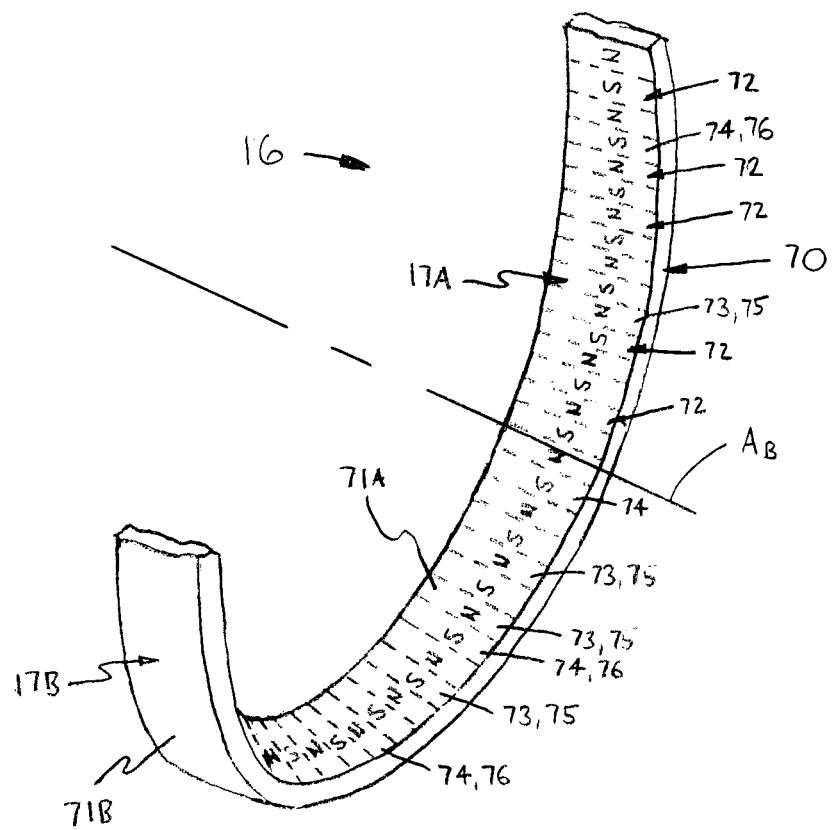
FIG. 6 is a broken-away, perspective view of the detection member, shown separate from the remainder of the sensor bearing assembly.

Referring again to FIGS. 1-6, the detection member 16 includes an annular body or ring 70 having inner and outer circumferential surfaces 71A, 71B. Preferably, the detection member outer surface 71B is frictionally engageable with the outer member central surface section 66, so as to couple the detection member 16 with the bearing outer member 14. The detection member 16 preferably includes a plurality of indicators 72 spaced circumferentially about the inner circumferential surface 71A of the member 16, as depicted in FIG. 6. Each indicator 72 corresponds to a separate angular position of the detection member 16 about the bearing axis $A_B$, and thus also the angular position of the bearing outer member 14 and the sheave 1 about the shaft axis $A_S$. With such indicators 72, the sensor 18 is configured to generate an output when any one of the indicators 72 displaces generally adjacent to the sensor outer end 34b. The output of the sensor 18 is used to determine angular position, angular displacement or/and rotational speed of the pulley sheave 1 about the axis $A_S$, depending on the specific processing of the output signals.

Referring particularly to FIG. 6, the plurality of indicators 72 preferably includes an alternating pattern of first and second indicators 73, 74 spaced apart about the axis $A_B$, with the sensor 18 being configured to generate a first output when a first indicator 73 is disposed adjacent to the sensor outer end 34b and a second output when a second indicator 74 is disposed adjacent to the sensor end 34b. Most preferably, the detection member 16 is formed as a known magnetic pulse ring or encoder ring having a plurality of pairs of alternating north and south magnetic poles 75, 76 providing the first and second indicators 73, 74. Alternatively, the detection member 16 may be formed as an optical encoder ring (not shown) with an optical pattern of alternating transparent or opaque areas providing the first and second indicators 73, 74, or as a toothed wheel or gear (not shown), in which each tooth provides a first indicator 73 and each gap provides a second indicator 74. Further, although the detection member 16 is preferably a separate piece or component coupled with the bearing outer member 14, the detection member 16 may alternatively be integrally formed with the outer member 14, such as for example, as a plurality of axial splines formed the outer member central portion 30 and providing a toothed wheel structure.

Referring now to FIGS. 1, 2 and 4, the bearing assembly 10 preferably further comprises first and second seals 80, 82 disposed between the inner and outer members 12, 14. The first seal 80 is disposed at least generally proximal to the first ends 12a, 14a of each one of the inner and outer members 12, 14, respectively, and the second seal 82 is disposed at least generally proximal to the second axial ends 12b, 14b of each one of the inner and outer members 12, 14, respectively. Preferably, each seal 80, 82 is a radial lip seal having an elastomeric sealing element 84 biased by a garter spring 86 so as to maintain sealing engagement, as indicated in FIG. 4, but may alternatively be any other appropriate type of seal. Alternatively, the sensor bearing assembly 10 may be provided without any seals between the bearing members 12, 14.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A sensor bearing assembly for rotatably coupling a pulley sheave with a shaft, the sheave having a bore and the shaft having an axis, the sensor bearing assembly having an axis and comprising:

a generally annular inner member with a central bore sized to receive a portion of the shaft so as to mount the bearing to the shaft, the inner member having first and second axially spaced inner raceway surfaces and a central portion extending generally axially between the two inner raceway surfaces;

a generally annular outer member disposed about the inner member and disposeable within the sheave bore, the outer member being coupleable with the sheave to rotatably couple the sheave with the shaft, the outer member having first and second, axially spaced outer raceway surfaces each disposed about a separate one of the first and second inner raceway surfaces and a central portion extending generally axially between the two outer raceway surfaces, the outer member central portion being disposed generally about the inner member central portion so as to define an annular cavity;

a first set of rolling elements disposed between the first inner and outer raceway surfaces and a second set of rolling elements disposed between the second inner and outer raceway surfaces;

a generally annular detection member disposed within the annular cavity and coupled with the outer member; and a sensor disposed within the annular detection member and connected with the inner member central portion, the sensor being configured to sense angular displacement of the detection member about the bearing axis.

2. The sensor bearing assembly as recited in claim 1 wherein the detection member is one of connected with the outer member central section and integrally formed with the outer member central section.

3. The sensor bearing assembly as recited in claim 1 wherein the inner bearing member includes:

a main body ring having inner and outer circumferential surfaces, the inner surface defining the inner member central bore;

first and second raceway rings each disposed about the main member outer surface and spaced axially apart, the first raceway ring providing the first raceway surface and the second raceway ring providing the second raceway surface; and a sensor mounting ring disposed between the first and second raceway rings, the sensor being attached to the sensor ring.

4. The sensor bearing assembly as recited in claim 3 wherein:

the sensor mounting ring has inner and outer circumferential surfaces and a mounting hole extending radially between the inner and outer surfaces; and the main ring of bearing inner member has a clearance hole extending radially between the inner and outer circumferential surfaces and generally aligned with the sensor ring mounting hole, and an access groove extending radially outwardly from the inner circumferential surface and generally axially between the clearance hole and one axial end of the main ring.

5. The sensor bearing assembly as recited in claim 3 wherein:

the bearing outer member includes a ring having inner and outer circumferential surfaces, the outer circumferential surface being engageable with the sheave bore and the inner circumferential surface including the first and second outer raceway surfaces and a central surface section located generally between the two outer raceway surfaces; and the detection member has inner and outer circumferential surfaces, the outer circumferential surface being engageable with the bearing outer member central surface section, and a plurality of indicators spaced circumferentially about the inner circumferential surface.

6. The sensor bearing assembly as recited in claim 5 wherein each one of the inner and outer bearing members has opposing first and second axial ends and the bearing assembly further comprises first and second seals disposed between the inner and outer members, the first seal being disposed at least generally proximal to the first end of each one of the inner and outer members and the second seal being disposed at least generally proximal to the second axial end of each one of the inner and outer members.

7. The sensor bearing assembly as recited in claim 1 wherein the detection member has an inner circumferential surface and a plurality of indicators spaced circumferentially about the inner surface and the sensor is configured to sense movement of the indicators so as to detect at least one of pulley sheave angular position and pulley sheave angular displacement.

8. The sensor bearing assembly as recited in claim 7 wherein the sensor has a first, inner radial end coupled with the bearing inner member and a second, outer radial end spaced radially inwardly from the detection member inner circumferential surface, the sensor being configured to generate an output when any one of the indicators displaces generally adjacent to the sensor inner end.

9. The sensor bearing assembly as recited in claim 7 wherein the plurality of indicators includes one of a plurality of pairs of north and south magnetic poles, a toothed wheel, and an optical pattern of alternating transparent and opaque areas.

10. A sensor bearing assembly for rotatably coupling a pulley sheave with a shaft, the sheave having a bore and the shaft having an axis, the sensor bearing assembly having an axis and comprising:

a generally annular inner member with a central bore sized to receive a portion of the shaft so as to mount the bearing to the shaft, the inner member having opposing axial ends, first and second axially spaced inner raceway surfaces, a central portion extending generally axially between the two inner raceway surfaces, and a cable passage extending generally axially between the central portion and at least one of the two axial ends;

a generally annular outer member disposed about the inner member and disposeable within the sheave bore, the outer member being coupleable with the sheave to rotatably couple the sheave with the shaft, the outer member having first and second, axially spaced outer raceway surfaces each disposed about a separate one of the first and second inner raceway surfaces and a central portion extending generally axially between the two outer raceway surfaces, the outer member central portion being disposed generally about the inner member central portion so as to define an annular cavity;

a first set of rolling elements disposed between the first inner and outer raceway surfaces and a second set of rolling elements disposed between the second inner and outer raceway surfaces;

a generally annular detection member disposed within the annular cavity and coupled with the outer member; and a sensor disposed within the annular detection member, connected with the inner member central portion and being configured to sense angular displacement of the detection member about the bearing axis, the sensor having a body and at least one cable extending through the inner member cable passage, the cable having a first end attached to the sensor body and a second end disposed externally of the sensor bearing assembly.

11. The sensor bearing assembly as recited in claim 10 wherein the detection member is one of connected with the outer member central section and integrally formed with the outer member central section.

12. The sensor bearing assembly as recited in claim 10 wherein the inner bearing member includes:
   a main body ring having inner and outer circumferential surfaces, the inner surface defining the inner member central bore;
   first and second raceway rings each disposed about the main member outer surface and spaced axially apart, the first raceway ring providing the first raceway surface and the second raceway ring providing the second raceway surface; and
   a sensor mounting ring disposed between the first and second raceway rings, the sensor being attached to the sensor ring.

13. The sensor bearing assembly as recited in claim 12 wherein:
   the sensor mounting ring has inner and outer circumferential surfaces and a mounting hole extending radially between the inner and outer surfaces; and
   the main ring of bearing inner member has a clearance hole extending radially between the inner and outer circumferential surfaces and generally aligned with the sensor ring mounting hole, and an access groove extending radially outwardly from the inner circumferential surface and generally axially between the clearance hole and one axial end of the main ring.

14. The sensor bearing assembly as recited in claim 12 wherein:
   the bearing outer member includes a ring having inner and outer circumferential surfaces, the outer circumferential surface being engageable with the sheave bore and the inner circumferential surface including the first and second outer raceway surfaces and a central surface section located generally between the two outer raceway surfaces; and
   the detection member has inner and outer circumferential surfaces, the outer circumferential surface being engageable with the bearing outer member central surface section, and a plurality of indicators spaced circumferentially about the inner circumferential surface.

15. The sensor bearing assembly as recited in claim 14 wherein each one of the inner and outer bearing members has opposing first and second axial ends and the bearing assembly further comprises first and second seals disposed between the inner and outer members, the first seal being disposed at least generally proximal to the first end of each one of the inner and outer members and the second seal being disposed at least generally proximal to the second axial end of each one of the inner and outer members.

16. The sensor bearing assembly as recited in claim 10 wherein the detection member has an inner circumferential surface and a plurality of indicators spaced circumferentially about the inner surface and the sensor is configured to sense movement of the indicators so as to detect at least one of pulley sheave angular position and pulley sheave angular displacement.

17. The sensor bearing assembly as recited in claim 16 wherein the sensor has a first, inner radial end coupled with the bearing inner member and a second, outer radial end spaced radially inwardly from the detection member inner circumferential surface, the sensor being configured to generate an output when any one of the indicators displaces generally adjacent to the sensor inner end.

18. The sensor bearing assembly as recited in claim 16 wherein the plurality of indicators includes one of a plurality of pairs of north and south magnetic poles, a toothed wheel, and an optical pattern of alternating transparent and opaque areas.

19. A pulley assembly comprising:
   a pulley sheave having a bore;
   a shaft having an axis; and
   a sensor bearing assembly configured to rotatably couple the sheave with the shaft, having an axis collinear with the shaft axis, and comprising:
      a generally annular inner member with a central bore sized to receive a portion of the shaft so as to mount the bearing to the shaft, the inner member having first and second axially spaced inner raceway surfaces and a central portion extending generally axially between the two inner raceway surfaces;
      a generally annular outer member disposed about the inner member and disposeable within the sheave bore, the outer member being coupleable with the sheave to rotatably couple the sheave with the shaft, the outer member having first and second, axially spaced outer raceway surfaces each disposed about a separate one of the first and second inner raceway surfaces and a central portion extending generally axially between the two outer raceway surfaces, the outer member central portion being disposed generally about the inner member central portion so as to define an annular cavity;
      a first set of rolling elements disposed between the first inner and outer raceway surfaces and a second set of rolling elements disposed between the second inner and outer raceway surfaces;
      a generally annular detection member disposed within the annular cavity and coupled with the outer member; and
      a sensor disposed within the annular detection member and connected with the inner member central portion, the sensor being configured to sense angular displacement of the detection member about the bearing axis.

* * * * *